US012661743B2

(12) United States Patent
Morak et al.

(10) Patent No.: US 12,661,743 B2
(45) Date of Patent: Jun. 23, 2026

(54) COMPOSITE MATERIAL AND METHOD FOR PRODUCING SAID COMPOSITE MATERIAL

(71) Applicant: AMAG ROLLING GMBH, Braunau am Inn—Ranshofen (AT)

(72) Inventors: Petra Morak, Ranshofen (AT); Gerhard Hanko, Simbach am Inn (DE)

(73) Assignee: AMAG ROLLING GMBH, Braunau am Inn—Ranshofen (AT)

( * ) Notice: Subject to any disclaimer, the term of this patent is extended or adjusted under 35 U.S.C. 154(b) by 96 days.

(21) Appl. No.: 18/851,780

(22) PCT Filed: Mar. 29, 2023

(86) PCT No.: PCT/EP2023/058199
§ 371 (c)(1),
(2) Date: Sep. 27, 2024

(87) PCT Pub. No.: WO2023/187010
PCT Pub. Date: Oct. 5, 2023

(65) Prior Publication Data
US 2025/0326072 A1 Oct. 23, 2025

(30) Foreign Application Priority Data
Mar. 29, 2022 (EP) ..................................... 22165276

(51) Int. Cl.
| | |
|---|---|
| *B32B 15/01* | (2006.01) |
| *B21B 3/00* | (2006.01) |
| *B23K 35/28* | (2006.01) |
| *B23K 35/365* | (2006.01) |
(Continued)

(52) U.S. Cl.
CPC .............. *B23K 35/365* (2013.01); *B21B 3/00* (2013.01); *B23K 35/288* (2013.01); *B32B 15/016* (2013.01); *C22C 21/02* (2013.01); *C23G 1/22* (2013.01)

(58) Field of Classification Search
None
See application file for complete search history.

(56) References Cited

U.S. PATENT DOCUMENTS

2022/0072665 A1 3/2022 Mori et al.

FOREIGN PATENT DOCUMENTS

| | | | |
|---|---|---|---|
| DE | 202012011376 U1 | 8/2013 |
| EP | 2844466 B1 | 9/2016 |
(Continued)

OTHER PUBLICATIONS

International Search Report & Written Opinion for PCT Application No. PCT/EP2023/058199, mailed Jun. 21, 2023; 13 pages.

*Primary Examiner* — Daniel J. Schleis

(57) ABSTRACT

A composite material and method for producing said composite material are disclosed, with a support layer composed of a wrought aluminum alloy and with an external solder layer composed of an aluminum solder alloy provided on one or both flat sides of the support layer, wherein the solder layer has partially exposed silicon particles on its surface, which constitute a first area fraction of the total area of the surface of the solder layer. In order to reliably ensure flux-free solderability, it is proposed for the solder layer to have a rolled surface and for its aluminum solder alloy to contain at least 0.1 wt % bismuth (Bi), wherein the first area fraction is greater than 2.5%.

20 Claims, 5 Drawing Sheets

(51) Int. Cl.
    *C22C 21/02*     (2006.01)
    *C23G 1/22*     (2006.01)

(56)             References Cited

FOREIGN PATENT DOCUMENTS

| JP | 2010247209 | A | 11/2010 |
| WO | 2021205856 | A1 | 10/2021 |

COMPOSITE MATERIAL AND METHOD FOR PRODUCING SAID COMPOSITE MATERIAL

TECHNICAL FIELD

The invention relates to a method for producing a composite material and to said composite material, more particularly a plated sheet metal or plated strip, with a support layer composed of a wrought aluminum alloy and with an external solder layer composed of an aluminum solder alloy provided on one or both flat sides of the support layer, wherein the solder layer has partially exposed silicon particles on its surface, which constitute a first area fraction of the total area of the surface of the solder layer.

PRIOR ART

For flux-free CAB soldering (soldering in a controlled atmosphere), EP2844466B1 has disclosed a composite material with a support layer or core layer made of an AA 3003 wrought aluminum alloy and with a solder layer made of an AlSi12 aluminum solder alloy, which solder layer has partially exposed silicon particles on the surface. To produce these silicon particles on the surface, the solder layer of the finished composite material is alkaline pickled after cold rolling. However, this also roughens the rolled surface of the solder layer to a comparatively high degree.

These comparatively abrasive silicon particles on the surface in combination with the increased surface roughness disadvantageously lead to increased tool wear on a sheet metal processing tool, for example a stamping tool, with which the composite material, in terms of its dimensions, is prepared for the soldering.

SUMMARY OF THE INVENTION

The object of the invention, therefore, is to modify a composite material of the type mentioned at the beginning in such a way that it can be subjected to mechanical separation processes with low wear despite its flux-free solderability.

Because the aluminum matrix has a rolled surface, it is possible to ensure that the silicon particles partially exposed on the surface protrude at most up to the reference plane formed by the surrounding aluminum matrix. This correspondingly reduces an abrasive action of the silicon particles on a cutting tool, more particularly because such a rolled surface can also excel with correspondingly reduced characteristic values with regard to the roughness. The composite material according to the invention (for example in the form of sheet metal or a strip), however, not only can excel due to a low-wear processing or further processing with mechanical cutting methods, but also retains its flux-free solderability. This is achieved by the fact that the solder layer has a rolled surface and its aluminum solder alloy contains at least 0.1 wt % bismuth (Bi), wherein the first area fraction is greater than 2.5%. This provides a flux-free solderable composite material that can be prepared for soldering in the same way as other composite materials that do not have flux-free solderability.

For the desired flux-free soldering, it can turn out to be sufficient, for example, if the first area fraction is less than 25%. Despite the exposed silicon particles, the tool wear can be kept to a minimum—all the more so if the first area fraction is less than 20% or—for example—less than 12%.

Preferably, the first area fraction is in the range from 3 to 10%. More particularly, the soldering process and thus the soldering result can already improve significantly starting at a lower limit of 3%. Up to an upper limit of 10%, the tool wear can remain comparatively low, which minimizes the maintenance cost for the tools used to process the sheet metal or strip.

If the aluminum solder alloy contains up to 0.40 wt % bismuth (Bi), the wettability between the molten soldering material and the material to be joined can be significantly improved. This in turn allows slightly higher gap dimensions, which can, however, be of considerable importance for the consequent soldering result.

A low-wear tool processing of the composite material can be recognized, for example, from the fact that the rolled surface (O) of the solder layer has a gloss value according to DIN EN ISO 2813:2014 of at least 50 GU, measured at an angle of 60° and transversely to the rolling direction. Preferably, the gloss value according to DIN EN ISO 2813:2014 is greater than 60 GU. For example, a measuring device called the "micro-TRI-gloss S" from BYK-Gardner GmbH can be used for this measurement.

The rolled surface can have silicon particles pressed into an aluminum matrix of the solder layer, which are anchored in the aluminum matrix by the rolling process. These pressed-in silicon particles lead to an increase in silicon on the surface of the solder layer, which in turn leads to an improvement in the melting capacity during soldering. It is thus possible to ensure the flux-free solderability of the composite material, even after forming with comparatively high degrees of deformation, which makes the composite material suitable for universal use.

Tool wear during further processing of the sheet metal or strip can be further reduced if the aluminum matrix of the solder layer on the rolled surface forms a reference profile in the roughness profile of the rolled surface, wherein the silicon particles that are partially exposed on the rolled surface do not protrude from this reference profile.

Preferably, the silicon particles are situated in depressions in the rolled surface. For example, a depression surrounds one or more silicon particles at least partially, in particular completely. This interrupts the flat course of the oxide layer over the surface of the aluminum matrix and facilitates its break-up during flux-free soldering. This can make the composite material even more user-friendly during soldering, more particularly when soldering without flux.

Preferably, the aluminum solder alloy contains from 6.8 to 13 wt % silicon (Si), from 0.1 to 0.40 wt % bismuth (Bi), and from 0.10 to 0.40 wt % magnesium (Mg). Preferably, the aluminum solder alloy can contain from 8.5 to 12 wt % silicon (Si). Preferably, the aluminum solder alloy can contain from 0.1 to 0.3 wt % bismuth (Bi). Preferably, the aluminum solder alloy can contain from 0.2 to 0.35 wt % magnesium (Mg).

Individually or in combination, the aluminum solder alloy can optionally contain:

up to 1.2, more particularly up to 0.3, wt % zinc (Zn)

up to 0.6, more particularly up to 0.5, wt % iron (Fe)

up to 0.2 wt % titanium (Ti)

up to 0.2, more particularly up to 0.1, wt % manganese (Mn)

up to 0.2, more particularly up to 0.1, wt % copper (Cu)

up to 0.03%, more particularly up to 0.02%, wt % strontium (Sr)

up to 0.2, more particularly up to 0.1, wt % tin (Sn)

up to 0.2 wt %, more particularly up to 0.1, wt % antimony (Sb)

The aluminum solder alloy contains residual aluminum and inevitable production-related impurities, each totaling at most 0.05 wt % and together totaling at most 0.15 wt %.

Preferably, the ratio in wt % of magnesium (Mg) to bismuth (Bi) in the aluminum solder alloy is less than or equal to 4. Among other things, this can prevent unwanted deposits in the soldering furnace. If the ratio is in the range of 0.5 to 2.7, this can have a particularly advantageous effect on a breaking-up of the aluminum oxide layer during soldering. More particularly, this range can also ensure sufficient fluidity of the solder.

Preferably, the wrought aluminum alloy contains from 0 to 1.6 wt % manganese (Mn), from 0 to 0.90 wt % copper (Cu), and from 0.05 to 1.0 wt % silicon (Si). Preferably, the wrought aluminum alloy can contain from 0.8 to 1.4 wt % manganese (Mn). Preferably, the wrought aluminum alloy can contain from 0.05 to 0.6 wt % copper (Cu). Preferably, the wrought aluminum alloy can contain from 0.05 to 0.6 wt % silicon (Si).

Individually or in combination, the wrought aluminum alloy can optionally contain:

- up to 0.60, more particularly up to 0.45, wt % iron (Fe)
- up to 0.8, more particularly up to 0.6, wt % magnesium (Mg)
- up to 0.15, more particularly up to 0.10, wt % zinc (Zn)
- up to 0.20 wt % titanium (Ti)

The wrought aluminum alloy contains residual aluminum and inevitable production-related impurities, each totaling at most 0.05 wt % and together totaling at most 0.15 wt %.

For example, in order to achieve the advantages according to the invention, the wrought aluminum alloy is an aluminum alloy of type EN AW-1xxx, EN AW-3xxx, EN AW-5xxx, or EN AW-6xxx.

It is known that the composite material can be reduced to the final thickness (end thickness) by cold rolling. This cold rolling of sheet metal or a strip (also referred to as sheet metal strip or metal strip) can be used to produce a rolled surface on the solder layer. According to the invention, an increase in the first area fraction of silicon particles exposed on the surface of the solder layer is achieved in that the composite material is subjected to cold rolling with at least one cold rolling pass, wherein before a cold rolling pass of the at least one cold rolling pass, the surface of the solder layer is subjected to a pickling treatment with a pickling agent, more particularly an alkaline pickling agent. This makes it possible to reproducibly generate a surface that has silicon particles but nevertheless a low roughness.

For example the pickling treatment can take place between two cold rolling passes of the cold rolling process if the cold rolling process comprises several cold rolling passes.

A comparatively high first area fraction of silicon particles exposed on the surface of the solder layer can be achieved if the pickling treatment takes place immediately before the last cold rolling pass of the cold rolling process.

Preferably, the pickling treatment can take place between two cold rolling passes of the cold rolling process and/or immediately before the last cold rolling pass of the cold rolling process in order to make the method more user-friendly.

Preferably, a pickling agent with a pH value in the range from 11.0 to 14.0 is used. A pickling agent with a pH value in the range from 12 to 13.5 can turn out to be sufficient for the desired first area fraction.

Preferably, the pickling duration can be in the range from 15 to 300 in order to be able to expose a sufficiently high number of silicon particles on the surface, which particles are nevertheless bonded firmly enough to the aluminum matrix. Even a pickling duration in the range from 30 to 90 seconds can be sufficient.

If the pickling depth is in the range from 1 to 7 μm, for example, a sufficiently high number of silicon particles can be exposed by removing the aluminum matrix surrounding the silicon particles.

Preferably, the alkaline pickling agent contains a sodium hydroxide solution with a concentration in the range from 8 to 16 wt % in order to provide a sufficient pickling attack.

The composite material according to the invention that is produced with the method according to the invention can more particularly be suitable for a flux-free thermal joining method, more particularly soldering, preferably under a protective gas. More particularly, the joining method can also take place at atmospheric pressure according to DIN ISO 2533 (1013.25 hPa).

BRIEF DESCRIPTION OF THE DRAWINGS

By way of example, the subject of the invention is shown in greater detail in the drawings. In the drawings:

FIG. 3b shows a cutaway view along the line III-III in FIG. 3a.

DETAILED DESCRIPTION OF THE INVENTION

FIGS. 1a to 1f show secondary electron images of the surface of the respective composite material measured with a Zeiss EVO 40 scanning electron microscope with an acceleration voltage of 15 kV and a working distance of 10.5 mm.

FIGS. 2a to 2f each represent a silicon mapping with a resolution of 512×384 pixels, which is composed of 25 individual images. From these FIGS. 2a to 2f, the first area fraction of the partially exposed silicon particles in the inverted image was evaluated using Olympus Stream phase analysis software with a threshold value of 160 for FIGS. 2a to 2d and with a threshold value of 210 for FIGS. 2e and 2f.

To demonstrate the effects achieved, six composite materials A-F in the form of sheet metal, wherein a strip (often also referred to as sheet metal strip) is also conceivable, were produced by roll cladding the flat sides of a support layer (often also called a core layer) with a solder layer on both sides. Composites A-F are soldering materials. The material thickness after the roll cladding is 1.5 mm (millimeters) for composite material A, 0.5 mm for composite materials B and C, and 1.0 mm for composite materials D to F.

The support layers of composite materials A to F each have a wrought aluminum alloy with

|   | Mn wt % | Cu wt % | Si wt % | Fe wt % | Mg wt % | Zn wt % | Ti wt % |
|---|---------|---------|---------|---------|---------|---------|---------|
| A | 1.05 | 0.06 | 0.24 | 0.44 | 0.01 | 0.03 | 0.01 |
| B | 0.95 | 0.27 | 0.13 | 0.19 | 0.26 | 0.01 | 0.19 |
| C | 0.95 | 0.27 | 0.13 | 0.19 | 0.26 | 0.01 | 0.19 |
| D | 0.85 | 0.26 | 0.13 | 0.24 | 0.22 | 0.01 | 0.11 |
| E | 0.06 | 0.05 | 0.45 | 0.28 | 0.55 | 0.03 | 0.02 |
| F | 0.01 | 0.01 | 0.11 | 0.27 | 0.01 | 0.03 | 0.01 | as well as residual aluminum and inevitable production-related impurities, each totaling at most 0.05 wt % and together totaling at most 0.15 wt %.

The solder layers of composite materials A to F each have an aluminum solder alloy with

|   | Si wt % | Bi wt % | Mg wt % | Fe wt % | Ti wt % | Mn wt % |
|---|---------|---------|---------|---------|---------|---------|
| A | 10.5 | — | 0.19 | 0.33 | — | 0.02 |
| B | 9.0 | 0.28 | 0.32 | 0.28 | 0.20 | 0.02 |
| C | 9.0 | 0.28 | 0.32 | 0.28 | 0.20 | 0.02 |
| D | 10.2 | 0.11 | 0.20 | 0.33 | 0.14 | 0.02 |
| E | 9.2 | 0.19 | 0.32 | 0.30 | 0.01 | 0.02 |
| F | 11.3 | 0.33 | 0.31 | 0.30 | 0.02 | 0.02 | as well as residual aluminum and inevitable production-related impurities, each totaling at most 0.05 wt % and together totaling at most 0.15 wt %.

Composite Material A:

Composite material A has a support layer composed of an aluminum alloy of type EN AW-3xxx and a solder layer according to Table 1, which corresponds to type EN AW-4xxx.

Figure 1A:
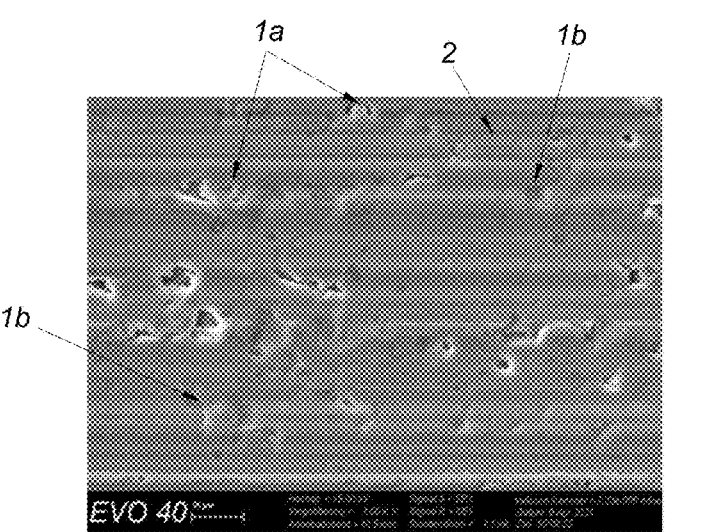
FIG. 1a shows a top view of a first composite material A without a pickling treatment.

FIG. 1a shows a secondary electron image of the surface of composite material A measured with a Zeiss EVO 40 scanning electron microscope with an acceleration voltage of 15 kV and a working distance of 10.5 mm.

According to FIG. 1a, a small number of silicon particles 1a is exposed on the surface of composite material A; in FIG. 1a, these are visible as light gray, rounded areas surrounded by a black border. The silicon particles 1a are surrounded by the aluminum matrix 2. Some silicon particles 1b are apparent through the surface—but are not exposed on the surface.

Figures 2A, 2B, 2C:
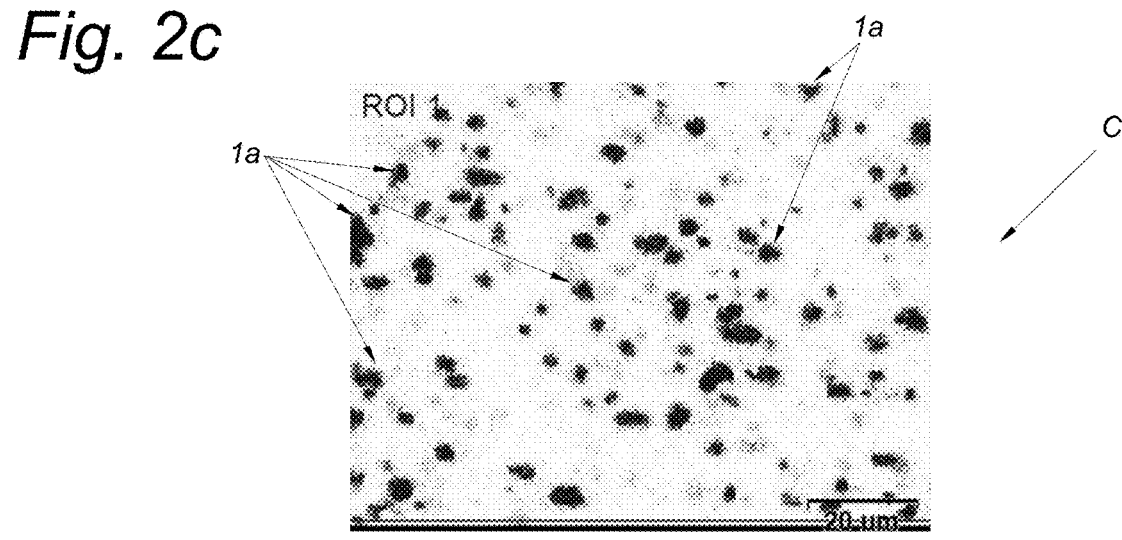
FIGS. 2a to 2f are depictions of a respective first area fraction of exposed silicon particles of composite materials A, B, C, D, E, and F from FIGS. 1a to 1f.

FIG. 2a shows the first area fraction of the partially exposed silicon particles 1a of composite material A. The first area fraction is 0.4%.

Composite Material B:

By contrast with composite material A, after the last cold rolling pass in the cold rolling process of the composite material to its final thickness, composite material B was subjected to an alkaline pickling process with a pH value of 12.9, comprising a sodium hydroxide solution with a concentration of 12 wt %, and with a duration of 75s (seconds).

Figure 1B:
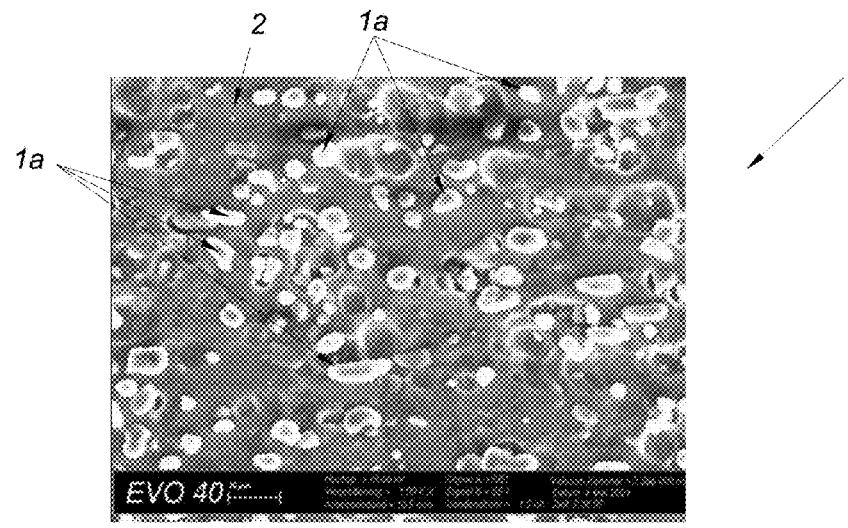
FIG. 1b shows a top view of a second composite material B with a pickling treatment after the cold rolling.

FIG. 1b shows an image of the surface of composite material B. A large number of silicon particles 1a are exposed on the surface of the composite material A—which are visible as light-colored areas in FIG. 1b.

FIG. 2b shows the first area fraction of the exposed silicon particles 1a of composite material B. The first area fraction is 24.3%.

Composite Material C (According to the Invention):

In the case of composite material C according to the invention, the alkaline pickling attack on the surface of the solder layer described for composite material B was carried out—in the exemplary embodiment immediately—before the last cold rolling pass in the cold rolling process of the composite material to its final thickness.

Figure 1C:
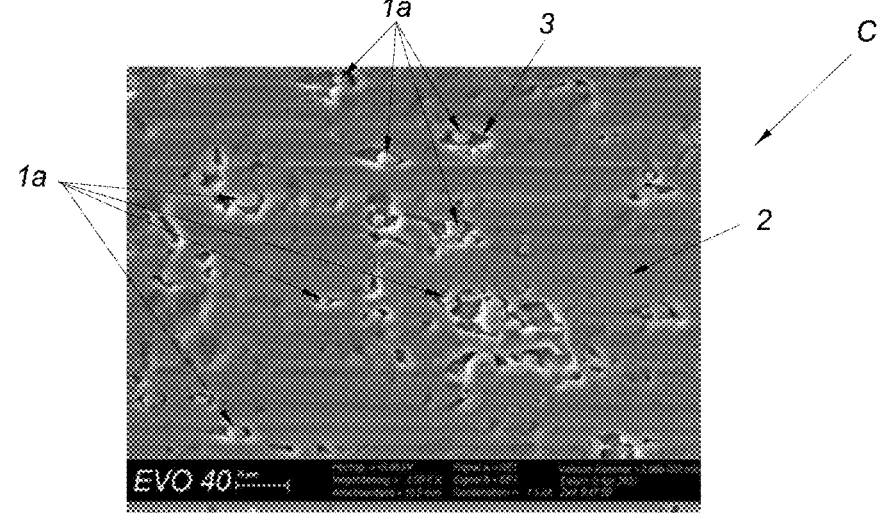
FIG. 1c shows a top view of a third composite material C with a pickling treatment before the last cold rolling pass.

FIG. 1c shows an image of the surface of composite material C according to the invention. The number of silicon particles 1a that are exposed on the surface of composite material C, which are visible as light gray, rounded areas surrounded by a black border in FIG. 1c, is elevated in comparison to that of composite material A in FIG. 1a. This number is significantly lower in relation to composite material B, however.

FIG. 2c shows the first area fraction of the partially exposed silicon particles 1a of composite material C. The first area fraction is 7.2%.

Composite Material D (According to the Invention):

Composite material D according to the invention was likewise subjected to an alkaline pickling attack on the surface of the solder layer—in the exemplary embodiment immediately—before the last cold rolling pass in the cold rolling process of the composite material to its final thickness.

Figure 1D:
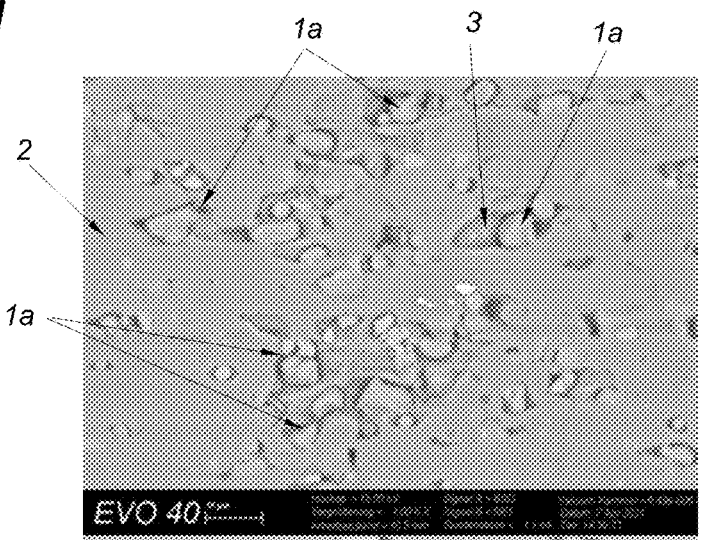
FIG. 1d shows a top view of a fourth composite material D with a pickling treatment before the last cold rolling pass.

FIG. 1d shows an image of the surface of composite material D according to the invention. The number of silicon particles 1a that are exposed on the surface of composite material D, which are visible as light gray, rounded areas surrounded by a black border in FIG. 1d, is elevated in comparison to that of composite material A in FIG. 1a. It is similar to that of composite material C.

Figure 2D:
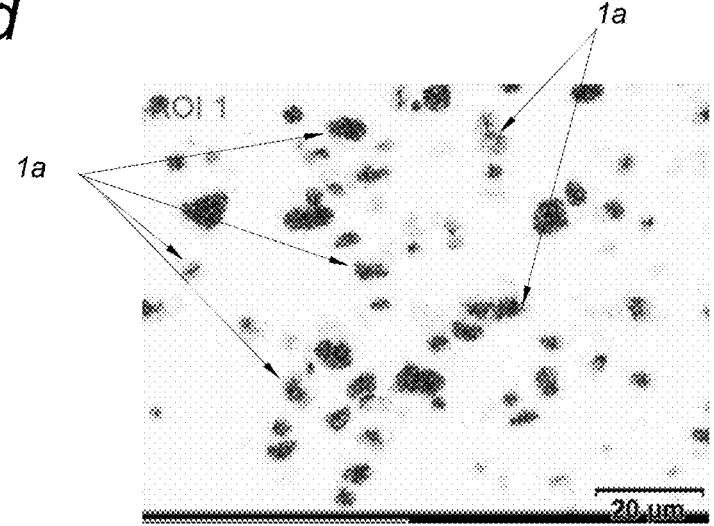

FIG. 2d shows the first area fraction of the partially exposed silicon particles 1a of composite material C. The first area fraction is 4.2%.

Composite Material E (According to the Invention):

Composite material E is a soldering material, which has a support layer composed of an aluminum alloy of type 6xxx and a solder layer of type 4xxx.

Composite material E was likewise subjected to an alkaline pickling attack on the surface of the solder layer—in the exemplary embodiment immediately—before the last cold rolling pass in the cold rolling process of the composite material to its final thickness.

Figure 1E:
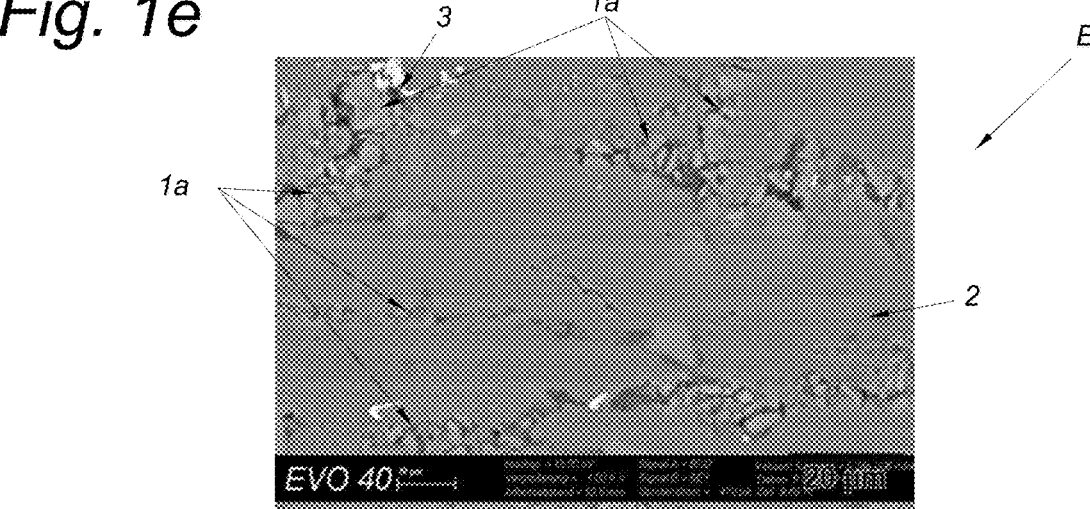
FIG. 1e shows a top view of a fifth composite material E with a pickling treatment before the last cold rolling pass.

FIG. 1e shows an image of the surface of composite material E according to the invention. The number of silicon particles 1a that are exposed on the surface of composite material E, which are visible as light gray, rounded areas surrounded by a black border in FIG. 1e, is elevated in comparison to that of composite material A in FIGS. 1a and 1s similar to that of composite materials C and D, but is significantly lower than that of composite material B.

Figure 2E:
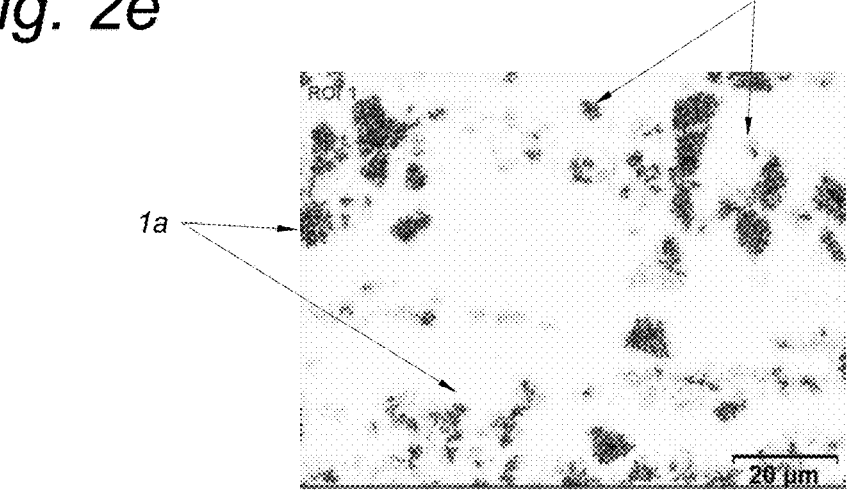

FIG. 2e shows the first area fraction of the partially exposed silicon particles 1a of composite material E. The first area fraction is 7%.

Composite Material F (According to the Invention):

Composite material F according to the invention is a soldering material, which has a support layer composed of an aluminum alloy of type 1xxx and a solder layer of type 4xxx.

Composite material F was likewise subjected to an alkaline pickling attack on the surface of the solder layer—in the exemplary embodiment immediately—before the last cold rolling pass in the cold rolling process of the composite material to its final thickness.

Figure 1F:
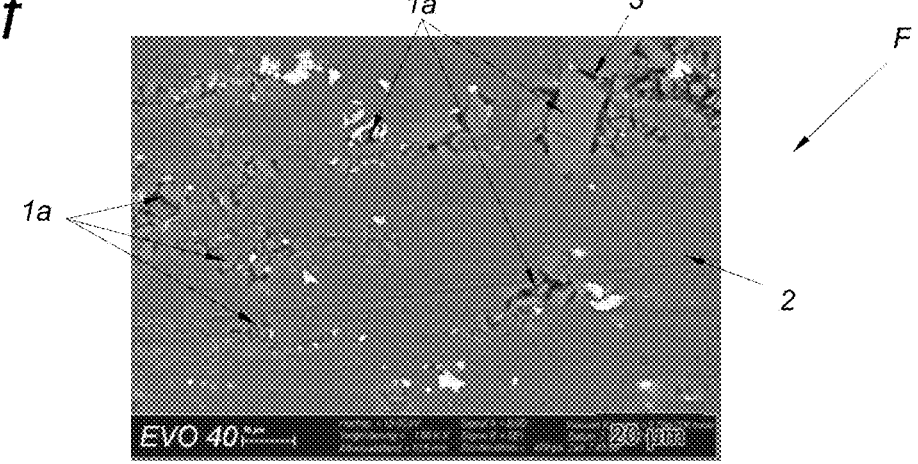
FIG. 1f shows a top view of a sixth composite material F with a pickling treatment before the last cold rolling pass.

FIG. 1f shows an image of the surface of composite material F according to the invention. The number of silicon particles 1a that are exposed on the surface of composite material F, which are visible as light gray, rounded areas surrounded by a black border in FIG. 1*f*, is elevated in comparison to that of composite material A in FIGS. 1*a* and 1*s* similar to that of composite materials C, D and E but is significantly lower than that of composite material B.

Figure 2F:
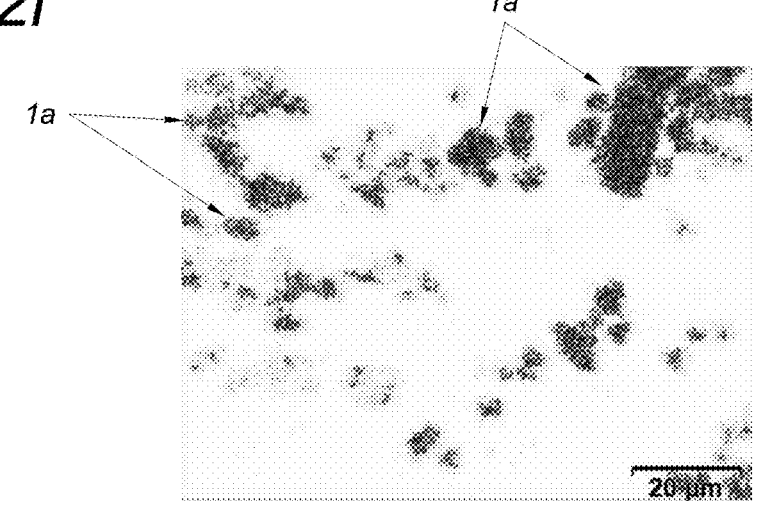
Figure 2F:

FIG. 2*f* shows the first area fraction of the partially exposed silicon particles 1*a* of composite material F. The first area fraction is 8%.

Sheet metal parts were cut out from composite materials A to F in the form of sheet metal with the aid of a mechanical cutting process, namely stamping. In addition, composite materials A to F were soldered together using a CAB soldering method without flux, i.e. by means of flux-free soldering with another aluminum material of type 3003 at atmospheric pressure according to DIN ISO 2533 (1013.25 hPa).

Composites A to F are characterized by the following properties:

TABLE 1

| Measurement data | | | |
| --- | --- | --- | --- |
| Gloss value [GU] 60°, transverse to rolling direction | Si particles area fraction [%] | Exposed surface wear | Flux-free soldering |
| A | 103 | 0.4 | low | not possible |
| B | 25 | 24.3 | high | possible |
| C | 86 | 7.2 | low | possible |
| D | 92 | 4.2 | low | possible |
| E | 79 | 7 | low | possible |
| F | 68 | 8 | low | possible |

As is clear from Table 1, composite material A does not permit flux-free joining by means of a CAB soldering method.

A flux-free soldering is indeed possible with composite material B, but this composite material B with the pickled surface and the protruding silicon particles 1*a* is disadvantageously characterized by a high exposed surface wear on a cutting or forming tool that is used to set the dimensions or form of the composite material B before the joining. The surface topography, specifically with further processing of the soldering material, has a significant influence on the friction conditions and as a further consequence, also on the springback during forming. The result of high springback after forming is a not insignificantly poor measurement tolerance, which leads to problems in soldering with regard to the minimum gap width. High surface roughnesses also have a negative impact on the maximum deformability of the materials since the lubricant can no longer be uniformly distributed in the contact zone of the rough surface. The exposed surface wear is chiefly produced by abrasion of the cutting edges at the exposed Si particles of the solder layer, which Si particles protrude significantly from the surface of the aluminum matrix due to the pickling.

In addition, composite material B also exhibits a lower gloss value of 25 GU compared to the other composite materials, measured at an angle of 60° and transversely to the rolling direction. This also shows the negative property of the surface of composite material B.

Figure 3A:
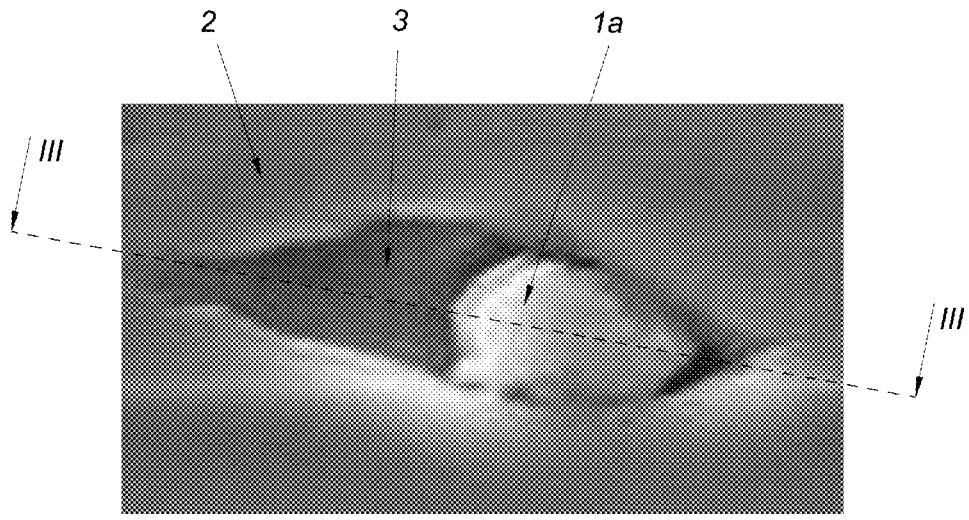
FIG. 3a shows an enlarged top view of a silicon particle from FIG. 1c.
Figure 3B:
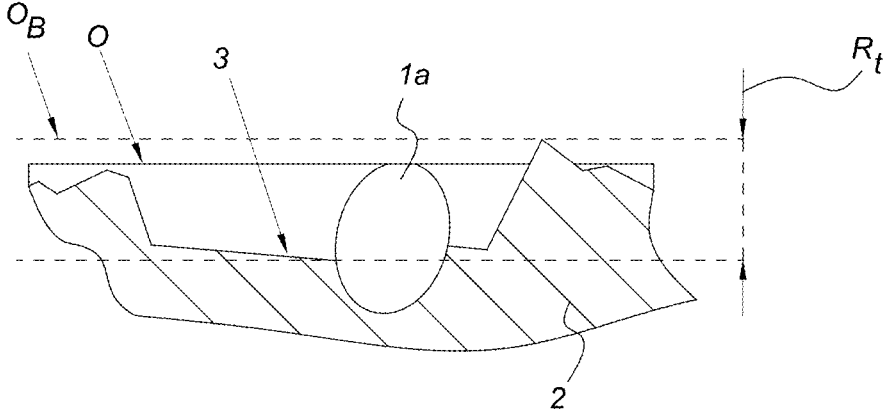

A different surface can be seen in composite materials C, D, E, and F according to the invention. Here, the Si particles protruding from the surface contour of the aluminum matrix are not visible—as can be seen in FIGS. 1*c* to 1*f*. The silicon particles 1*a* are pressed into the aluminum matrix of the solder layer because of the rolling, namely cold rolling, and therefore do not protrude from a reference profile $O_B$ of the roughness profile of the rolled surface O of the solder layer. This reference profile $O_B$ is formed by the aluminum matrix 2 of the solder layer on the rolled surface, as can be seen in FIG. 3*b*. The reference profile $O_B$ is formed by the highest peak of the roughness profile of the aluminum matrix 2. For example, the maximum roughness depth Rt or $R_{max}$ of the roughness profile is plotted for the sake of clarity. The exposed surface wear on tools therefore decreases significantly and an improved dimensional accuracy of formed parts is established, which is required in flux-free soldering.

A depression 3 is also visible on the surface O of the solder layer at the silicon particles 1*a* (see FIG. 1*c*), which at least partially surrounds the pressed-in silicon particles 1*a*. The depression 3 is embodied as elongated in the rolling direction, which can be seen, for example, in the eye-shaped boundary contour in FIG. 1*c*. The silicon particles 1*a* are situated in these depressions 3.

These pressed-in silicon particles according to FIGS. 1*c* to 1*f* also have little to no influence on the glossiness of the surface. Consequently, composite materials C, D, E, and F can be expected to have approximately the same gloss value that composite material A exhibits—which is also clear from Table 1. In direct comparison to composite material B, however, composite materials C, D, E, and F each have a significantly higher gloss value. This difference in the gloss values between the non-pickled composite material A, the pickled composite material B without subsequent cold forming, and composite materials C, D, E, and F, which are pickled before the last cold rolling step, is clearly shown in Table 1. This is also very apparent in FIGS. 1*a*, 1*b*, and 1*c* to 1*f*. These figures clearly show that the first area fraction of exposed silicon particles is significantly increased by the pickling before the last cold rolling—this in comparison to a material without a pickling treatment, which likewise has pressed—in silicon particles, but a much smaller number of them, on the surface.

The pickling process breaks up the aluminum matrix, which surrounds the silicon particles, and the silicon particles remain on the surface and now protrude from the matrix.

The pickling removal of the aluminum matrix depends among other things on the temperature, the duration, and the concentration of the pickling solution and in this regard, can easily be adjusted in an extremely flexible way. Through the forming of the material by means of cold rolling that is carried out after the pickling process, the silicon particles that protrude from the surface after the pickling are pressed into the surface (aluminum matrix) due to their higher strength in comparison to the aluminum matrix. This increases the number of silicon particles on the surface and enriches the surface of the soldering material with silicon. This enrichment, which cannot be achieved by means of a rolling process without an additional pickling treatment, leads to an improvement of the soldering in connection with fluxes and to an improvement of a use in the flux-free soldering sector with the same forming behavior of the material.

The flux-free solderable composite materials C, D, E, and F according to the invention can therefore be used with low-wear mechanical cutting methods, for example a stamping, and do not require special measures in the geometric preparation before a joining process.

It should be noted in general that the German expression "insbesondere" can be translated as "more particularly" in English. A feature that is preceded by "more particularly" is to be considered an optional feature, which can be omitted and does not thereby constitute a limitation, for example, of the claims. The same is true for the German expression "vorzugsweise", which is translated as "preferably" in English.

The invention claimed is:

1. A composite material comprising:

a support layer composed of a wrought aluminum alloy, and an external solder layer provided on one or both flat sides of the support layer, wherein the external solder layer is composed of an aluminum solder alloy containing at least 0.1 wt % bismuth (Bi) and the solder layer has a rolled surface, wherein the solder layer has partially exposed silicon particles on its surface, which constitute a first area fraction of a total area of the surface of the solder layer, wherein the first area fraction is greater than 2.5%.

2. The composite material according to claim 1, wherein the first area fraction is less than 25%.

3. The composite material according to claim 1, wherein the first area fraction is in a range from 3 to 10%.

4. The composite material according to claim 1, wherein the aluminum solder alloy contains up to 0.40 wt % bismuth (Bi).

5. The composite material according to claim 1, wherein the rolled surface of the solder layer has a gloss value according to DIN EN ISO 2813:2014 of at least 50 GU measured at an angle of 60° and transversely to a rolling direction.

6. The composite material according to claim 1, wherein the rolled surface has the silicon particles pressed into an aluminum matrix of the solder layer.

7. The composite material according to claim 6, wherein the aluminum matrix of the solder layer on the rolled surface forms a reference profile of a roughness profile of the rolled surface, wherein the silicon particles that are partially exposed on the rolled surface do not protrude from the reference profile.

8. The composite material according to claim 1, wherein the silicon particles are situated in depressions in the rolled surface.

9. The composite material according to claim 1, wherein the aluminum solder alloy contains

| from 6.8 to 13 | wt % silicon (Si), |
| from 0.1 to 0.40 | wt % bismuth (Bi), |
| from 0.10 to 0.40 | wt % magnesium (Mg), | optionally—individually or in combination:

| up to 1.2 | wt % zinc (Zn) |
| up to 0.6 | wt % iron (Fe) |
| up to 0.2 | wt % titanium (Ti) |
| up to 0.2, | wt % manganese (Mn) |
| up to 0.2 | wt % copper (Cu) |
| up to 0.03% | wt % strontium (Sr) |

-continued

| up to 0.2 | wt % tin (Sn) |
| up to 0.2 | wt % antimony (Sb) | as well as residual aluminum and inevitable production-related impurities, each totaling at most 0.05 wt % and together totaling at most 0.15 wt %.

10. The composite material according to claim 1, wherein a ratio in wt % of magnesium (Mg) to bismuth (Bi) in the aluminum solder alloy is less than or equal to 4.

11. The composite material according to claim 1, wherein the wrought aluminum alloy contains

| from 0 to 1.6 | wt % manganese (Mn), |
| from 0 to 0.90 | wt % copper (Cu), |
| from 0.05 to 1.0 | wt % silicon (Si), | optionally—individually or in combination:

| up to 0.60 | wt % iron (Fe) |
| up to 0.8 | wt % magnesium (Mg) |
| up to 0.15 | wt % zinc (Zn) |
| up to 0.20 | wt % titanium (Ti) | as well as residual aluminum and inevitable production-related impurities, each totaling at most 0.05 wt % and together totaling at most 0.15 wt %.

12. The composite material according to claim 1, wherein the wrought aluminum alloy is of type EN AW-1xxx, EN AW-3xxx, EN AW-5xxx, or EN AW-6xxx.

13. The composite material according to claim 1, wherein the composite material is plated sheet metal or a plated strip.

14. A method for producing the composite material according to claim 1, comprising:

subjecting the composite material to cold rolling with at least one cold rolling pass, wherein before a cold rolling pass of the at least one cold rolling pass, the surface of the solder layer is subjected to a pickling treatment with a pickling agent.

15. The method according to claim 14, wherein the pickling treatment takes place between two cold rolling passes of the cold rolling process and/or immediately before a last cold rolling pass of the cold rolling process.

16. The method according to claim 14, wherein the pickling agent has a pH value in a range from 11.0 to 14.0 and/or a duration of the pickling treatment is in a range from 15 to 300 seconds.

17. The method according to claim 14, wherein a pickling depth of the pickling treatment is in a range from 1 to 7 μm.

18. The method according to claim 14, wherein the pickling agent is an alkaline pickling agent.

19. A method of using the composite material according to claim 1, comprising using the composite material in a flux-free thermal joining method by soldering under a protective gas at atmospheric pressure.

20. The method according to claim 18, wherein the alkaline pickling agent contains a sodium hydroxide solution with a concentration in a range from 8 to 16 wt %.

* * * * *